United States Patent Office 2,830,872
Patented Apr. 15, 1958

2,830,872

RECOVERY OF URANIUM VALUES FROM PHOSPHATE ROCK

Robert F. McCullough, Lakeland, Fla., assignor, by mesne assignments, to the United States of America as represented by the United States Atomic Energy Commission No Drawing. Application October 3, 1952
Serial No. 313,059

11 Claims. (Cl. 23—14.5)

This invention relates to a process of producing phosphate components for use in fertilizers, animal feed supplements and phosphatic chemicals, wherein a novel process has been devised for the production of phosphatic products and for the recovery of uranium values from the raw materials processed.

In the past, various grades of so-called superphosphate and triple superphosphate have been produced. Ordinarily, a high-grade superphosphate made in a conventional manner (that is, by reacting ground phosphate rock with sulfuric acid) contains no more than about 20% by weight of available $P_2O_5$, of which about 75–80% is normally present in water-soluble condition. Similarly, the high-grade triple superphosphate of commerce is produced by acidifying ground phosphate rock with orthophosphoric acid. This produces a product ordinarily containing about 47% by weight of $P_2O_5$, of which better than 95% is available and about 90% of the total available is water-soluble. The terms "water-soluble" and "available," as used herein, are used as specified and defined by the Association of Official Agricultural Chemists with reference to the phosphorus content of phosphatic components of fertilizers.

It is an object of the present invention to produce dicalcium phosphate in an efficient manner.

It is an object of the present invention to produce dicalcium phosphate and other phosphate chemical compounds substantially free of fluorine or its compounds in an efficient manner.

It is an object of the present invention to recover uranium and/or its compounds from the materials of intermediate treatment stages in the production of dicalcium phosphate.

It is an object of the present invention to recover uranium compounds relatively free of calcium compounds from the phosphorus-containing liquor processed.

Other objects of the invention will be apparent from a further understanding of the invention as more fully hereinafter described.

A raw phosphatic material comprising essentially tricalcium phosphate or its mineral equivalent (for example, collophane or apatite, of either high or low phosphatic content, and usually containing combined calcium fluoride) is allowed to react with sulfuric acid in combination with an oxidizing agent, such as nitric acid, under constant and intensive agitation for a sufficient time. The phosphatic source material is best utilized if it is previously finely ground, i. e., 50–85% passing a 200 mesh screen. Less finely ground rock may be used, but the subsequent acidulation reaction requires a considerably longer time to achieve substantial as well as complete conversion. Sulfuric acid of any convenient dilution, for example about 51–55° Bé., is added to the ground phosphate rock in such a proportion that there will be present in the mix between about 101 and about 120% of the sulfuric acid requirement to convert all of the $P_2O_5$ present in the rock to monocalcium phosphate, allowing in addition, enough acid to also react with the impurities such as iron, alumina, fluorine, etc. The amount of acid added, which is preferably added as 60–70% sulfuric acid or any other suitable concentration, is sufficient to produce a major amount of monocalcium phosphate and a minor amount of orthophosphoric acid and dicalcium phosphate with a $CaO/P_2O_5$ mole ratio in the subsequent liquors of between about 0.5 to 1 and about 0.75 to 1.

The nitric acid, or other material having oxidizing ability under the existing reaction conditions, is added to the extent of between about 0.1 and about 5.0 pounds of nitric acid, preferably 0.4 to 1.0 pound per 100 pounds of phosphate rock treated. For other oxidizing agents employed the number of pounds added will vary from these stated ranges in proportion to the ratio of the oxidization equivalent of these agents to the oxidation equivalent of nitric acid. The use of the oxidizing agent results in increasing the water-solubility of the uranium content of the Florida phosphate rock.

The oxidizing agent may be added in the case of solid substances, as solid material or in aqueous solution and, of course, in the case of liquid oxidizing agents, as liquids. It is preferable to add the oxidizing agent substantially simultaneously with the sulfuric acid addition or preceding the sulfuric acid addition since these expedients result in an excellent water-solubilizing of the $P_2O_5$ and uranium values. The addition of the oxidizing agent subsequent to the sulfuric acid addition is useful but usually less desirable from the standpoint of good recoveries of uranium. The nitric acid or other oxidizing agent is added to the phosphate rock acid mixing apparatus by means of a separate line from that employed for the sulfuric acid addition. Suitable oxidizing agents that may be employed in place of nitric acid are the hypochlorites, chlorites, chlorates, perchlorates, alkali metal nitrates, alkaline earth metal nitrates, such as hydrogen peroxide, potassium chlorate, sodium chlorate, sodium potassium, calcium nitrates, manganese dioxide, potassium permanganate and calcium hypochlorite. These examples are representative and not an exclusive list, for other agents capable of effecting oxidation under the reaction conditions may be employed.

Florida phosphate rock, or other suitable phosphatic source material, is ground and/or sized at least to the point where 50% passes a 200 mesh screen. This material has admixed therewith, with agitation, the previously described quantity of sulfuric and nitric acid. The concentration of sulfuric acid used is very important, since it affects the percentage of phosphorus values that are recovered by the process. Florida phosphate rock is admixed with the acid-oxidizing agent combination before described and agitated for about one minute to insure thorough mixing. The dilution of the nitric acid is such that the sulfuric dilution remains substantially unaltered from the 60 to 70% sulfuric acid dilution heretofore stated. Although it is physically possible to agitate this freshly prepared admixture for a considerable period of time, maximum recovery of phosphorus values in their water-soluble forms is attainable when the period of agitation is kept as short as possible; provided, however, that the mixing is sufficiently long and intense to afford intimate and uniform distribution of sulfuric acid and nitric acid throughout the phosphate rock mass, and further provided the acidified rock is subsequently stored. This period of agitation under these process limitations has been found to be preferably about one minute, or slightly less.

The slurry prepared using about 110% sulfuric acid acidulation, once having been thoroughly mixed, is passed onto a continuous and moving belt on which it is allowed to remain for a period of time sufficient to permit the soupy material to partially harden or set. This is usually between about twenty and about sixty minutes, but is not critical so long as the material has partially set-up and is not soupy when discharged from the belt. The speed of the belt is such as to give a depth of material sufficient to obtain a resultant set of the desired bulk density and to allow the required amount of time for the mix to partially harden before being discharged therefrom. Upon discharge from the belt, the material, having attained its initial set, is transferred to a storage pile. When handled as above described it is easily removed from the pile after storage for from five to fifteen days by means of mechanical shovels or scoops, or manually. At all times during storage, and at the time of removal from storage, the material is porous and friable. In this respect it differs widely from the set-up and cured superphosphate of commerce. The material remains in the storage pile to allow the reactions to approach equilibrium and to bring the water-soluble $P_2O_5$ in the material up to the maximum, within practical limits. Generally, a two-week storage time will result in a material containing between about 94 and about 97% water-soluble $P_2O_5$, which is desirable at this point in the process, in view of subsequent process steps. The stored material is then easily pulped or slurried with an aqueous medium, since it is not set into a hard mass or lumps which require disintegration by application of explosives or use of hammer mills, etc. In no case does the form or physical character of the resulting material have any effect on the subsequent process, which depends entirely on its water-soluble content. These physical steps of acid slurrying, agitation, hydration and storage are designed to increase to an optimum the total water-soluble $P_2O_5$ and $U_3O_8$ content of the material for its use as a feed to the subsequent steps. Storage of the reacted mixtures in a pile, for six or seven days or up to fifteen days, or even longer, for example up to 30 days, will also further increase the water-soluble phosphatic material; but a minimum period of fourteen days is desirable. This storage time may be shortened, to a limited extent, without sacrifice of water-solubility, if the raw phosphatic feed is more finely ground and/or sized. The highest recovery of water-soluble phosphorus values was achieved using 63 to 70% sulfuric acid. A maximum recovery of $P_2O_5$ values in the case of a mix aged thirteen days was attained using about 66.5% acid and in the case of a mix aged twenty-five days using about 69% acid.

Preferably a 10 to 15% molar excess of sulfuric acid is employed together with at least one half pound of nitric acid and preferably at least one pound of nitric acid, on an anhydrous basis, per 100 pounds of rock processed in order to attain maximum conversion of the phosphorus and uranium values in the phosphatic feed material to water-soluble forms, while at the same time avoiding over-acidulating the phosphatic material, which would increase the cost without obtaining a corresponding increase in recovery of water-soluble phosphorus and/or uranium values.

A low bulk density of the rock-acid mix, while not sacrificing production and recovery of water-soluble phosphorus values, is of great importance and is one of the novel features of the instant process. The short stirring time results in a product which stores well, i. e., it does not set up in a hard form as does ordinary superphosphate, but remains soft and friable over indefinite periods of time. It thus results in easier subsequent handling and makes it possible to save considerable expense for labor and equipment charges over those required when handling stored superphosphate.

The acidified material is then agitated with previously prepared dilute leach solution to which water may have been added if no water, as such, is added during the leaching. Sufficient liquid leaching medium is added so that the resulting slurry contains between about 35 and about 40% solids as a practical matter, although more concentrated or more dilute slurries may be formed if desired. The agitation and slurrying is for a short period (usually five to fifteen minutes being ample) either while hot or under atmospheric temperatures, but preferably while hot in order to reduce viscosity and to aid in the subsequent separation of solids from liquid.

The aqueous phosphatic solution is then separated from the solids, the solids being discarded. Separation of the solids from the solution may be carried out in any convenient and conventional manner; such as, for example, by countercurrent multistage filtration or decantation (preferably at about 50–60° C.), by centrifuging (preferably countercurrent multistage centrifuging), or by use of liquid phase cyclone separators (also preferably countercurrent multistage separation). Increasing the temperature increases the capacity of the settling or separation device. However, if material is held over 60° C. for any considerable length of time, some of the water-soluble $P_2O_5$ precipitates as insoluble dicalcium phosphate. Batteries of up to three or more decantation vessels, cyclone separators, centrifuges, and repulpers, arranged in countercurrent series with solids underflow densities of 55–60% solids, are preferably used.

Sufficient solution, including water addition, is used for leaching so as to give, as a practical operation, a resulting phosphate solution having an analysis of between about 20 and about 33% dissolved solids and between about 80 and 67% water, respectively. The residue of nondissolved solids which is discarded and/or reprocessed contains only about 2.5% of the original $P_2O_5$, only about half of which is available and only about 10% of the uranium originally present. The solids residue is largely calcium sulfate. The phosphate solution after separation from the undissolved solids comprises essentially monocalcium phosphate, a small amout of orthophosphoric acid, usually with a $CaO/P_2O_5$ mole ratio of between about 0.5 to 1 and about 0.75 to 1, and various amounts of uranium, dependent upon the acidulation conditions, $P_2O_5$ solution composition and content of the original rock, usually about 0.009% $U_3O_8$ for a 20% $P_2O_5$ solution.

The aforesaid acidulation conditions, using mixtures of sulfuric acid and nitric acid, or other material capable of producing oxidizing reactions, are normally preferred. Of course, it is understood that mixtures of the oxidizing agents, capable of producing the oxidizing reactions under the reaction conditions prevailing, can also be used together with the sulfuric acid, for example, phosphate rock acidulated with sulfuric acid and a mixture of $HNO_3$ and $Ca(ClO)_2 \cdot 4H_2O$ to solubilize uranium. Likewise it is to be understood that if sulfuric acid only is used there is no appreciable decrease in $P_2O_5$ solubilization, but a substantial decrease in uranium solubilization as shown in the following table.

TABLE

| Oxidizing Agent | Lbs. Reagent/100 lbs. Rock | Percent $H_2SO_4$ Acidulation | Percent of Total U Solubilized |
|---|---|---|---|
| None | None | 110 | 22.3 |
| $HNO_3$ | 3.1 | 100 | 64.0 |
| $HNO_3$ | 1.8 | 105 | 79.2 |
| $HNO_3$ | 3.5 | 110 | 86.5 |
| $KClO_3$ | 4.0 | 100 | 72.7 |
| $Ca(ClO)_2 \cdot 4H_2O$ | 5.0 | 110 | 72.5 |
| $NaNO_3$ | 1.0 | 110 | 58.7 |
| $MnO_2$ | 2.7 | 100 | 55.1 |

The above table shows data on the relative amounts of total uranium originally present in the phosphate rock and found to be water-solubilized using the amounts of oxidizing agents shown and the total amount of sulfuric acid used based on the acid reactable components of the phosphate rock. The sulfuric acid was added as 68% sulfuric acid in practically all cases. The solubilized P₂O₅ values obtained were in the amounts expected when considering the percent acidulation stated and the number of days of aging or curing before water extracting the cured mix.

The monocalcium phosphate aqueous solution containing the dissolved uranium values is subjected to contact with an organic solvent extraction or to contact with an anion resin exchange to selectively remove the uranium values from the phosphate values. The organic solvent extractant selectively dissolves or takes up the uranium values and the anion resin selectively sorbs and holds the uranium values. These separation processes are broadly already well known but the present process of solvent extraction is an improvement of the prior process. An improved process of using the resin as the selective agent is more fully described and claimed in copending application Serial No. 314,953, filed October 15, 1952.

The liquid extract aqueous solution containing the uranium dissolved therein is preferably first subjected to a reduction reaction. This may be accomplished by electrolytic means or by chemical reaction wherein the solution is treated with metallic iron, aluminum or other free metals or other reducing agents capable of reducing the solution but not substantially introducing metallic ions detrimental to specifications of the phosphatic products subsequently recovered, said metals usually being added in solid form. This is believed to reduce the uranium from a hexavalent state to a quadrivalent state. If the addition agent is in powdered form the slurry, after several minutes is subjected to a liquid-solid separation to remove the unreacted and insoluble metal therefrom. This may be accomplished through the use of a filter, centrifuge, cyclone or other suitable separation device. The reduced aqueous phase is then intimately contacted, stirred or otherwise agitated with the organic solvent phase. This solvent phase is made up of two compounds, the extractant and the vehicle or extender. The extractant may be one or more of the ortho or pyro phosphoric acid esters of the alkyl monohydric alcohols. Both the mono and di esters, as well as mixtures of the two, are useful. The butyl, amyl, hexyl, heptyl, n-octyl, iso octyl, etc. esters with the phosphoric acids are satisfactory for the purpose, but it is prefered to use the mono and/or di esters of either octyl or hexyl alcohol with orthophosphoric acid since these are less water-soluble because its use minimizes any possibility of precipitation of phosphate compounds at the aqueous-organic liquid interface. Of course, it is to be understood that other extractants, which are relatively immiscible with the aqueous phase and having uranium removal characteristics, are likewise satisfactory. The extender or vehicle may be any one or more of the common organic solvents such as kerosene, benzene, varnish makers' and painters' naphtha, mineral spirits, carbon tetrachloride, beta,beta dichlordiethyl ether, trichlorethylene, toluene, xylenes, and the like. Extenders such as these are limited only in that they must be miscible or partially miscible with the extractant used and substantially immiscible with the aqueous phase. Since the esters or extractants have a limited solubility in water, before recycling to the uranium extraction system, the aqueous medium is scrubbed with any suitable solvent such as kerosene or trichlorethylene to reduce the ester content which would be lost in subsequent processing.

The concentration of the extractant in the extender or vehicle may vary widely, for example between about 0.2 and about 100.0%, preferably between about 5 and about 10%. The volume ratios of aqueous phase to organic phase also may vary within wide limits, for example between about 1 to 1 and about 40 to 1, preferably between about 5 to 1 and about 20 to 1. It is preferred to contact the organic phase with the aqueous phase under conditions near that which the latter emerges from the countercurrent leaching circuit, i. e., usually at a temperature of between about room temperature and about 60° C., preferably about 50° C. After agitation of the two phases for about one minute or less, although longer times may be used, the aqueous phase is withdrawn from the bottom and the organic phase is withdrawn from the top of a mixer extraction column. A continuous extraction is usually carried out in commercial operation in a multistage countercurrent extract (using about 6 stages). This is preferred for efficient performance since, by using such a system, the organic phase will take up about 98% of the uranium values originally present in the aqueous phase. A single stage of extraction using normal octyl phosphoric acid ester has resulted in an extraction of about 95% of the uranium values present in the aqueous phase. Substantially complete reduction, 10% of extractant extended in kerosene and a 10 to 1 volume ratio of aqueous phase to organic phase was employed in that instance.

If the prior processing has been conditioned to effect substantially complete reduction of uranium the organic phase, because of its fairly high calcium content, is then treated with aqueous sulfuric acid to form as a precipitate calcium sulfates, the two phases being then separated from one another. The aqueous phase is either discarded or all or a portion thereof recycled. Sulfuric acid is added in such proportions that the phases in the resulting mixture rapidly separate. Usually an aqueous to organic volumetric phase ratio of between about 0.7 to about 5.0 and preferably between about 1.2 to 1.5 is used. Under these conditions the gypsum settles in the aqueous phase. Sulfuric acid is added generally as aqueous solution containing 20 to 40% sulfuric acid and preferably about 32% sulfuric acid. The organic phase is either recycled to the original extraction step to take up more uranium values or, preferably, it is treated with aqueous hydrofluoric acid in about 5 molar excess over that required to produce $UF_4$. This precipitated material, together with its accompanying aqueous HF phase, is separated from the organic phase and the solid containing $UF_4$ is recovered by filtering, centrifuging, or the like, washed and dried. The organic solvent from which the uranium values have been removed is heated to about 60° C. for about 15 minutes to evolve hydrofluoric acid which is recovered and reused and the organic phase reduced in HF concentration, is recycled for further extraction use in the process. This organic extractant, it has been found, loses its extraction efficiency. The efficiency can be partially restored by the procedure heretofore described, but after use through 5 to 10 cycles the efficiency drops to such a level that the extractant must be reactivated or discarded. Alternately, whether or not the hydrofluoric acid is evolved prior to recycle of the organic phase, and in order to maintain the extraction efficiency of the extractant, the organic phase is treated with solid phosphorus pentoxide and washed with 60% orthophosphoric acid prior to recycling it to the extraction columns.

Alternatively, the organic phase containing the uranium values is directly treated with aqueous hydrofluoric acid without a pretreatment step to remove calcium, uranium and other insoluble fluorides present in the organic phase. The separated aqueous phase then contains a mixed precipitate of a major amount of calcium fluoride and a minor amount of uranium tetrafluoride. On isolation of these mixed solids, they are treated with any convenient strength of aqueous sulfuric acid in sufficient amount to completely dissolve the $UF_4$ and to completely form calcium sulfate which is filtered from the solution, i. e., about 1.2 pounds anhydrous sulfuric acid per pound of precipitated material, diluted to give about 40% acid strength. The filtrate is then evaporated to the point where uranyl sulfate is crystallized upon cooling, after which the crystals are separated and removed from the solution, washed and dried. Another variation involves the treatment of the uranium-containing organic phase directly with aqueous sulfuric acid under conditions such that the mixture is conveniently handled but under conditions which prevent any appreciable decomposition of the organic phase, in sufficient amount to completely precipitate, as calcium sulfate, most or all of the calcium content of the organic phase, i. e., about 1.2 pounds anhydrous sulfuric acid per pound of precipitated material, diluted to give about 40% acid strength, and reacted at room temperature. This precipitate and its attendant aqueous phase is then separated from the organic phase and the aqueous slurry separated by filtration or the aqueous slurry is discarded. The organic phase is then treated with aqueous hydrofluoric acid and the precipitated $UF_4$ separated therefrom, washed and dried. Filter cakes analyzing about 58% $UF_4$ or more are obtainable using the organic selective extraction method or its alternative procedures as before described, although the yield recovery and purity of product obtained varies considerably depending upon which of the particular variations in the procedure is employed. The aqueous phase from the original extraction with organic selective solvent is then further processed to reduce its fluorine content and to recover the phosphorus values.

This aqueous solution after uranium removal is evaporated to dryness, at any convenient pressure and temperature suitable to the equipment requirements, to recover a mixture, depending upon the condition of drying, of calcium ortho or pyrophosphates and/or pyro or ortho phosphoric acid, care being taken normally that the temperature of the solution and of the resultant solids does not exceed about 200° C. The phosphate solution, after removing all water, under the above conditions of temperature, gives a solid material having the following typical distribution of constituents:

| | Percent by weight |
|---|---|
| Total $P_2O_5$ | 60.1 |
| Available $P_2O_5$ | 59.7 |
| Water-soluble $P_2O_5$ | 37.5 |
| Calcium oxide (combined) | 14.0 |

This solid material may be used as an animal phosphatic feed supplement, as a fertilizer compound, as an ingredient for compounding liquid fertilizers or as a material to make other phosphatic chemicals, and the like. Should temperatures above 200° C. be used in the drying operation and meta and/or pyrophosphatic materials be partially or completely formed, such products can be treated under autogenous pressure and temperature conditions in the presence of a small amount of water, in an autoclave, so that substantially complete conversion to orthophosphatic materials result, i. e., heating in an autoclave at about 160° C. for about 10 minutes.

Alternatively and preferably, however, the phosphatic solution is first treated normally with limestone and/or lime or other alkaline earth metal carbonates, oxides or hydroxides to precipitate the fluoride and/or silicon hexafluoride ions, present in the impure monocalcium phosphate solution, so that the resulting solution is substantially free of fluoride ions and products recovered from the treated solution are then useful as animal feed supplements or phosphate chemicals where the presence of fluorine compounds would be detrimental. Several methods have been advanced for the defluorination of solutions allied to monocalcium phosphate, such as treatment with activated carbon, anion exchange resins, hydroxyapatite, etc., but the preferred modification is the addition of alkaline earth compounds. Specifically, the monocalcium phosphate solution may be treated with substantially chemically pure calcium carbonate, calcium oxide, hydrated lime, magnesium oxide, magnesium carbonate, limestone or any other oxygen-containing basic alkaline earth metal compound, although the specific conditions for efficient removal of the fluoride ions will vary depending on the specific material used. Limestone has been found to efficiently decrease the fluoride concentration of the solution by precipitation of calcium fluoride and is normally preferred, commensurate with good economics for efficient plant operation.

Efficient removal of fluoride as a constituent of the impure monocalcium phosphate solution, heretofore mentioned, depends upon proper combinations of time, temperature, pounds of limestone per pound of solution treated, $P_2O_5$ concentration and the mesh size of the limestone used, since it is desirable to achieve a maximum removal through precipitation of fluoride with a minimum precipitation of $P_2O_5$ value. It has been found that this objective efficiently can be attained if the temperature during the fluoride removal is between about 40 and about 90° C. but preferably about 60° C. and the $P_2O_5$ concentration of the solution between 12 and 20% $P_2O_5$, preferably about 16% $P_2O_5$. Limestone can be added as various mesh sized material, such as minus 14 mesh to plus 100 mesh or minus 200 mesh to plus 500 mesh, etc. However, finer mesh fractions usually promote a faster removal of fluoride and unless other conditions of time, temperature, etc. are modified there will be an increased loss of $P_2O_5$ in the precipitate formed. The preferred material is the particle size distribution normally found in minus 14 mesh limestone mined from Florida deposits. Under the above stated conditions, between about 2.5 and about 5.0 pounds of limestone per 100 pounds of crude monocalcium phosphate solution are intimately mixed, normally with vigorous stirring, for about 45 minutes. Preferably, however, about 3.8 pounds of limestone are added per 100 pounds of 16% $P_2O_5$ monocalcium phosphate solution. The resulting slurry of precipitated fluoride is then subjected to a solid-liquid separation and the solid discarded. The phosphatic solution, low in fluoride, is then treated to recover phosphate products low in fluoride. These products can be recovered by one of several alternate procedures as calcium, ammonium, sodium or potassium phosphate. Recovery of a low fluoride calcium phosphate can be achieved by heating and evaporating to dryness, in any convenient manner, the low fluoride monocalcium phosphate solution under conditions as heretofore described. Generally, however, this solid phosphatic material is too hygroscopic to handle, store or ship well. It takes up moisture from the atmosphere and either cakes or becomes sticky and gummy. It is usually contemplated to treat either the solid material or the phosphate solution with an oxygen-containing basic inorganic calcium compound at least to the extent that the final solid phosphatic material loses most of its hygroscopic properties and thus becomes a suitable material for storing, handling, and shipping while avoiding caking, gumminess, or stickiness.

One method of lowering the hygroscopicity characteristic and tendency of the dissolved solids of the phosphate solution is to treat the solution with a sufficient amount of ground calcium carbonate so as to materially reduce this characteristic of the final and dried material. In place of using calcium carbonate, hydrated lime, superphosphate or other suitable dried phosphatic material as well as other basic inorganic oxygen-containing calcium compounds may also be used. If about 110% of the sulfuric acid requirement of the original rock is initially employed, about 3–4% by weight of calcium carbonate (10% by weight of final dried product) is added per unit of weight of solution (which is of a concentration of about 30% solids) in order to reduce the hygroscopicity sufficiently. The amount of basic oxygen-containing calcium compound added varies, depending on the percentage of solids in the solution and the $P_2O_5$ content desired in the final product.

The resulting, partially neutralized solution may then be evaporated to dryness, in any convenient manner, as stated before, to give a final product (mixed calcium phosphates) of 55–58% $P_2O_5$. Preferably the water is driven off through the use of a direct fired rotary dryer having a large recirculating load. Increments of the partially neutralized solution are added continuously to the recirculating load to the rotary dryer. The temperature of the dryer is maintained between about 150–230° C., preferably about 175° C., with a drying time suitable to give the final product a temperature no higher than 200° C. and a moisture content of between about 1–5%. These conditions are not such as to produce other than very small amounts of calcium pyrophosphate or calcium metaphosphate. Approximately one part of solution is added to four to ten parts of dried recirculating solids. This admixture constitutes the feed to the dryer. A feed to the dryer, containing more than about 15% moisture, may result in caking difficulties in the dryer; and too high a moisture content in the feed should therefore be avoided. The product removed from the dryer is screened; that portion of it sizing between −6 and +20 mesh is removed as the final product, and the remainder is recycled as circulating load. The final product is granular, nondusting, and nonhygroscopic. It contains less than 5% moisture. The oversize material from the dryer is ground and recirculated to the dryer; the undersize, as before stated, is recirculated to the dryer. At times it may be necessary also to return some of the sized product to the dryer to maintain proper moisture and drying balance between feed and product.

In a typical example, the final product analyzed about 55.9% $P_2O_5$ total, about 55.5% $P_2O_5$ available, of which about 37% was water-insoluble and the free orthophosphoric acid content was no more than about 5.4%. The calcium oxide content was about 21.1% and the fluorine content about 0.04%. The $P_2O_5$ present as metaphosphate was only 0.64%, there being practically no pyrophosphate present in the product. So far as is known, prior investigators have not been able to obtain a product of such a high available $P_2O_5$ content from the materials employed, nor have they been able to produce this desirable ratio of available and water-soluble $P_2O_5$ content so essential for high-grade fertilizer constituents. As previously described in general, another modification of the use of the leach solution to produce a high phosphatic content material, the phosphate solution so prepared—a major portion of the content of which is monocalcium phosphate—then passes to a mixer where it is mixed with a circulating load of previously dried material. To obtain the latter during initial operation of the process, without too great a loss or cost, a sufficient amount of superphosphate may be put into the dryer as a circulating load. The solution is mixed continuously as a part of the discharge from the dryer, and this mixture then enters the dryer. The discharge from the dryer is then removed and discarded or sold. Within a short period of time the discharge will consist of dried leach solution.

In still another modification of the drying step the phosphate solution, free of nondissolved solids, or the same solution to which a calcium compound of the type previously described has been added, or a slurry of this type may be fed directly to a heated kiln and reduced to a dry granular solid containing no more than about 5% moisture in a once-through operation. No circulating load of dry or partially dry material is required or used in practicing this modification. Generally, however, it is advisable to equip the inside of the kiln with freely moving heavy chains, or the outside with mechanical knockers or hammers in order to loosen caked material on the inner walls or prevent caking or gumming of semidry material on the inner walls. Additional methods of directly drying the solution to a finally dry granular solid phase include the atomizing, jetting or spraying of the solution or slurry into the heated kiln (which is usually direct fired). Powdered coal, gas, or oil fired kilns may be used and the material to be dried may be introduced at the fired end or opposite end of the kiln, preferably at the fired end.

Alternatively, the monocalcium phosphate solutions low in fluoride may be treated with oxygen-containing basic inorganic alkaline earth metal compound to precipitate calcium or other alkaline earth metal phosphates low in fluoride, although the preferred modification is the addition of limestone, hydrated lime, calcium oxide or mixtures thereof. It has been found that phosphatic values soluble in the above solution can be precipitated as water insoluble but largely citrate available $P_2O_5$ by the addition of high calcium, low magnesium oxygen-containing basic inorganic alkaline earth metal compounds, if said precipitation is carried out in accordance with the following procedure. The same may also be accomplished with the solution prior to the removal of fluoride, as heretofore described, should the fluoride concentration in the initial liquors be sufficiently low in the final product to meet the desired specifications for their ultimate use. The major difference between the treatments of the liquor is that impure monocalcium phosphate has a $CaO/P_2O_5$ mole ratio of between about 0.6 and about 0.75 while the same solution after the fluoride removal step previously described normally has a ratio of between about 0.7 and about 0.90, the former thus requiring somewhat more neutralizing agent than the latter to precipitate the phosphatic values. The actual concentration of $P_2O_5$ has not been found to be extremely critical if within the range of concentrations expected from the prior processing operations, i. e., between about 10% $P_2O_5$ and about 22% $P_2O_5$, preferably about 15% $P_2O_5$. This liquor normally is above 40° C. but less than boiling temperature and preferably the calcium phosphate is precipitated at about 55° C. When limestone is added to solutions under the above conditions sufficient amounts are used to substantially completely precipitate the phosphatic values. Preferably the said precipitation, whether batch or continuous operation is employed, is carried out with the limestone being gradually added to the solution or at the required rate in a continuous operation, while being continuously and intimately mixed and agitated to assure thorough distribution and mixing of the limestone with unreacted liquor and/or precipitated calcium phosphate. Limestone added should preferably be added as minus 100 mesh material although somewhat coarser material is satisfactory if time and other conditions of precipitation are slightly modified, i. e., increasing the time of agitation. The amount of limestone added to precipitate phosphatic material may vary quite widely although it is normally desirable to obtain substantially complete precipitation of the phosphatic values. Accordingly, between about 10 and about 22 pounds, preferably about 16 pounds of limestone are used per 100 pounds of 16% $P_2O_5$ solution containing a $CaO/P_2O_5$ mole ratio of about 0.86. Upon agitating the above for between about 10 minutes and about 1 hour or even longer, preferably, however, about 30 minutes, the resulting slurry containing the precipitated calcium phosphate, chiefly dicalcium phosphate, is subjected to a solid-liquid separation and the solid therefrom dried.

Liquor from the solid-liquid separation which is effected by the use of a drum filter, centrifuge, cyclone separator or the like, may be recycled, especially if the precipitation has not become substantially complete, to the leaching step for the acidulated phosphate rock, for dilution of the phosphatic liquors going to the defluorination operation. Precipitated calcium phosphates are then dried in conventional drying equipment, such as rotary dryers, roto-louver dryers, hearth dryers and the like, care being taken that the temperature of drying is not sufficiently high to introduce a significant formation of pyrophosphates and that the resulting dryer product, largely dicalcium phosphate, is citrate soluble.

Regardless of which Florida phosphatic material is employed as the feed, the material should be finely divided so that substantially all of it passes a 48 mesh screen and normally at least 50% passing minus 200 mesh. Generally, the finer the particle size, the faster and more complete the reaction between that particle and the sulfuric acid. To obtain increased water-solubility the process may be best utilized on phosphatic material of −150

+300 mesh, but it is not limited to material having such a degree of fineness.

As a specific example of the process, the following will serve as an illustration. It is not intended that the scope of the invention be limited thereto.

*Example*

Florida phosphate rock of about 68.6 BPL and containing about 0.01% uranium was ground to about 52.6% passing a 200 mesh screen. At the continuous rate of about 2.0 tons per hour this rock was fed to a paddle mixer with the simultaneous addition to the mixer of 51.44° Bé. at 60° F. aqueous sulfuric acid at about 115° F. to the extent of about 110% acidulation at the rate of about 1.94 tons per hour of the gravity used and at the same time there was added to the mixing chamber the equivalent of about 3 pounds of 100% nitric acid per 100 pounds of rock used added at the equivalent rate of about 120 pounds of 100% nitric acid per hour. The nitric acid was actually added at the rate of about 4 pounds of 1.44 specific gravity (74.5% $HNO_3$) acid per 100 pounds of rock used or about 161 pounds of this gravity of nitric acid per hour. The mixer paddles were rotating at about 120 revolutions per minute and the mixing retention time averaged about 1 minute. The soupy mix was continuously discharged onto a continuously moving belt where it remained for about 1 hour thus allowing sufficient time for the soupy mix to partially set-up and partially harden. After about 1 hour on the belt the set-up mix was discharged into a storage pile or bin where it was allowed to stand undisturbed for at least about 30 days, though in some instances such piles have stood for as long as 45 to 60 days without deleterious effects so far as the ultimate recovery of $P_2O_5$ and $U_3O_8$ values are concerned.

The friable, cured, acidulated rock mix, after standing about 30 days, was subjected to a continuous countercurrent, four-stage leaching operation with water. The water was added in the proportion of about 0.83 pound of water per pound of aged acidulated rock mix dry basis used. The rate of addition of the aged acidulated rock mix to the countercurrent extraction was about 18 pounds per minute and the water about two gallons per minute. The finished monocalcium phosphate leach solution was produced at the rate of about 1.1 gallons per minute. It had a gravity of about 30.2° Bé. at 108° F. and had the following analysis:

| Ingredient: | Percent by weight |
|---|---|
| $P_2O_5$ | 19.37 |
| F | .20 |
| $SO_4$ | 1.07 |
| $NO_3$ | 1.05 |
| CaO | 4.73 |
| U | 0.0108 |

The filter cake, after leaching with fresh water and filtering, contained about 5.8% $P_2O_5$.

The leach solution was subjected to contact with 2271 grams of powdered metallic iron per 100 gallons of leach solution and agitated for about 30 minutes after which the solids were filtered from the liquid. This liquid was then thoroughly contacted, at the rate of about 100 gallons per hour, with about 10 gallons per hour of an organic solvent composed of about 9 parts by volume of kerosene and about 1 part by volume of a mixture of the mono and di esters of orthophosphoric acid of n-octyl alcohol. The intimate contact was maintained for a few minutes, usually about 1 to 2 minutes. The organic solvent was separated from the aqueous phase which was then processed in accordance with the preceding description to recover the $P_2O_5$ values as defluorinated monocalcium phosphate or defluorinated dicalcium phosphate.

The uranium-containing organic solvent was treated with about 10 gallons per hour of 30% aqueous sulfuric acid to precipitate calcium sulfate therefrom. The aqueous slurry is removed and discarded and the uranium-containing organic solvent of reduced calcium content is treated with about 10 gallons per hour of 50% aqueous hydrofluoric acid with agitation. The aqueous slurry is continuously removed from the mixing column and the uranium tetrafluoride filtered from the solution. About 64 grams of 60% uranium content is recovered per hour. The aqueous HF filtrate is recycled to the precipitation step after first introducing additional gaseous hydrofluoric acid into it to restore its strength to 50% hydrofluoric acid.

The organic solvent phase, segregated from the aqueous hydrofluoric acid slurry, is treated with 0.89 pound of solid $P_2O_5$ per 10 gallons of solvent and washed with about 10 gallons of 60% aqueous orthophosphoric acid. After separating the aqueous phase for recycle to the phosphoric acid treatment step, the organic solvent is returned to the beginning of the solvent extraction operation for reuse in the system.

Although it is preferred to reduce the valance state of the uranium from six to four before treating with the selective organic solvent, it is satisfactory to extract as before stated, with the uranium in the hexavalent state if three or more stages of extraction in countercurrent relationship are employed.

Having now thus fully described and illustrated the character of the invention what is desired to be secured by Letters Patent is:

1. A process for the recovery of uranium values from phosphate rock which comprises acidulating said phosphate rock with aqueous sulfuric acid of between about 60 and about 70% strength in molar excess up to about 20% over that required to form monocalcium phosphate and to react with the reactable impurities present in the rock while agitating the admixture during the acidulation, to form an admixture containing a substantial portion of the uranium contained therein in hexavalent form aging the admixture for at least 14 days, admixing a liquid selected from the group consisting of water and an aqueous unsaturated monocalcium phosphate solution with the aged acidified phosphatic material, slurrying the same, separating undissolved solids from the phosphatic liquid, converting the uranium present in the resultant aqueous liquid to the quadrivalent state, contacting the solids-free liquid with an organic solvent containing an alkyl acid ester of an alkyl monohydric alcohol and a phosphoric acid selected from the group consisting of orthophosphoric acid and pyrophosphoric acid, separating the aqueous phase from the organic phase, treating the separated organic phase with aqueous sulfuric acid, separating the calcium sulfate aqueous slurry from the organic phase, treating the separated organic phase of reduced calcium content with sufficient aqueous hydrofluoric acid to precipitate substantially all of the uranium present and separating the uranium precipitate from the aqueous phase.

2. A process as in claim 1 wherein the organic solvent is contacted with the reduced solids-free phosphatic liquid in a multistage countercurrent liquid-liquid extraction operation.

3. A process as in claim 1 wherein the organic solvent is kerosene and the extractant contained therein is a mixture of mono and di esters of orthophosphoric acid of n-octyl alcohol.

4. A process for the recovery of uranium values from Florida phosphate rock which comprises acidulating said rock in comminuted condition such that at least 50% passes a 200 mesh standard screen with aqueous sulfuric acid of between about 60 and about 70% strength, said acidulated rock mixture containing at least one added reagent capable of oxidizing uranium to the hexavalent state under the prevailing reaction conditions, said sulfuric acid being used to the extent of between about 101 and about 120% acidulation of the constituents of the rock capable of reacting with sulfuric acid and to form monocalcium phosphate, agitating the mixture during the acidulation, aging the acid reacted mixture for between about 14 and about 30 days, admixing a liquid selected from the group consisting of water and an unsaturated aqueous monocalcium phosphate solution with the aged acidified phosphatic material, slurrying the same, separating undissolved solids from the phosphatic liquid, converting the uranium present in the phosphatic liquid to the quadrivalent state, contacting the solids-free liquid with an organic solvent containing an alkyl acid ester of an alkyl monohydric alcohol and a phosphoric acid selected from the group consisting of orthophosphoric acid and pyrophosphoric acid, separating the aqueous phase from the organic phase, treating the separated organic phase with aqueous sulfuric acid, separating the calcium sulfate aqueous slurry from the organic phase, treating the separated organic phase with sufficient aqueous hydrofluoric acid to precipitate substantially all of the uranium present and separating the uranium precipitate from the aqueous phase.

5. A process as in claim 4 wherein the added reagent is nitric acid.

6. A process as in claim 4 wherein the added reagent is nitric acid present in the amount of about 0.5 and about 5 pounds of nitric acid per 100 pounds of phosphate rock acidulated.

7. A process as in claim 4 wherein the organic solvent is kerosene and the extractant contained therein is a mixture of mono and di esters of orthophosphoric acid of n-octyl alcohol.

8. A process as in claim 4 wherein the organic solvent is kerosene and the extractant contained therein is a mixture of mono and di esters of orthophosphoric acid of n-octyl alcohol and wherein nitric acid is present in the amount of about 0.5 and about 5 pounds of nitric acid per 100 pounds of phosphate rock acidulated.

9. A process as in claim 4 wherein the organic solvent is contacted with the reduced solids-free phosphatic liquid in a multistage countercurrent liquid-liquid extraction operation.

10. A process for the recovery of uranium values from phosphate rock which comprises acidulating said phosphate rock with aqueous sulfuric acid of between about 60 and about 70% strength in molar excess up to about 20% over that required to form monocalcium phosphate and to react with the reactable impurities present in the rock while agitating the admixture during the acidulation, to form an admixture containing a substantial portion of the uranium contained therein in hexavalent form aging the admixture for at least about 14 days, admixing a liquid selected from the group consisting of water and an aqueous unsaturated monocalcium phosphate solution with the aged acidified phosphatic material, slurrying the same, separating undissolved solids from the phosphatic liquid, converting the uranium present in the resultant aqueous liquid to the quadrivalent state, contacting the solids-free liquid with an organic solvent containing an alkyl acid ester of an alkyl monohydric alcohol and a phosphoric acid selected from the group consisting of orthophosphoric acid and pyrophosphoric acid, separating the aqueous phase from the organic phase, treating the separated organic phase with sufficient aqueous hydrofluoric acid to precipitate substantially all of the uranium present, separating the uranium precipitate from the aqueous phase, treating the uranium-containing precipitate with aqueous sulfuric acid, heating the resultant slurry to evolve gaseous hydrofluoric acid therefrom, separating the calcium sulfate precipitate from the liquid phase and recovering uranyl sulfate from the solids-free liquid phase.

11. A process for the recovery of uranium values from Florida phosphate rock which comprises acidulating said rock in comminuted condition such that at least 50% passes a 200 mesh standard screen with aqueous sulfuric acid of between about 60 and about 70% strength, said acidulated rock mixture containing at least one added reagent capable of oxidizing uranium to the hexavalent state under the prevailing reaction conditions, said sulfuric acid being used to the extent of between about 101 and about 120 acidulation of the constituents of the rock capable of reacting with sulfuric acid and to form monocalcium phosphate, agitating the mixture during the acidulation, aging the acid reacted mixture for between about 14 and about 30 days, admixing a liquid selected from the group consisting of water and an unsaturated aqueous monocalcium phosphate solution with the aged acidified phosphatic material, slurrying the same, separating undissolved solids from the phosphatic liquid, converting the uranium present in the phosphatic liquid to the quadrivalent stage, contacting the solids-free liquid with an organic solvent containing an alkyl acid ester of an alkyl monohydric alcohol and a phosphoric acid selected from the group consisting of orthophosphoric acid and pyrophosphoric acid, separating the aqueous phase from the organic phase, treating the separated aqueous phase with sufficient aqueous hydrofluoric acid to precipitate substantially all of the uranium present, separating the uranium precipitate from the aqueous phase, treating the uranium-containing precipitate with aqueous sulfuric acid, heating the resultant slurry to evolve gaseous hydrofluoric acid therefrom, separating the calcium sulfate precipitate from the liquid phase and recovering uranyl sulfate from the solids-free liquid phase.

References Cited in the file of this patent

UNITED STATES PATENTS

| | | |
|---|---|---|
| 2,013,970 | Moore | Sep. 10, 1935 |
| 2,227,833 | Hixson et al. | Jan. 7, 1941 |

FOREIGN PATENTS

| | | |
|---|---|---|
| 437,833 | Great Britain | Nov. 6, 1935 |

OTHER REFERENCES

Fritsch: The Manufacture of Chemical Manures, pp. 68, 73–83 and 137 (1911); pub. by Scott, Greenwood & Son, London.

Friend: Textbook of Inorganic Chemistry, vol. VII, part III, p. 291 (1926); pub. by Charles Griffin & Co., Ltd., London.

Warf: U. S. Atomic Energy Commission declassified document No. 2524, declassified Mar. 11, 1949, 10 pages.

Guntz: Comptes Rendus, vol. 234, pp. 868–870 (Feb. 18, 1952).